Oct. 4, 1927.
F. W. WILKINS
RADIUS ROD
Filed April 17, 1924
1,643,970
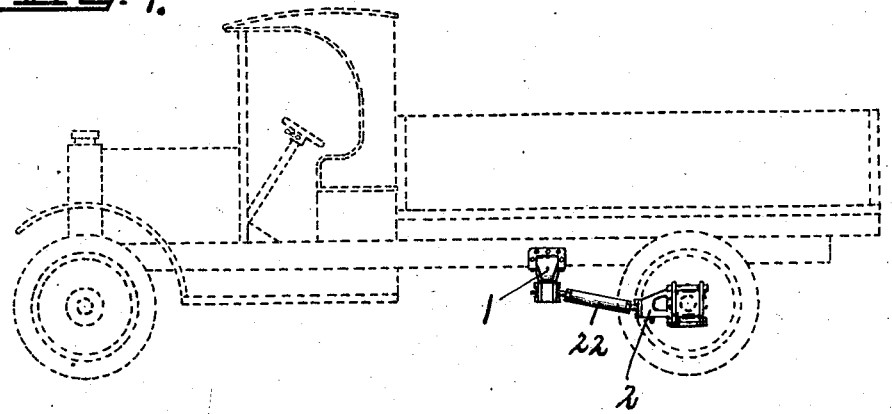
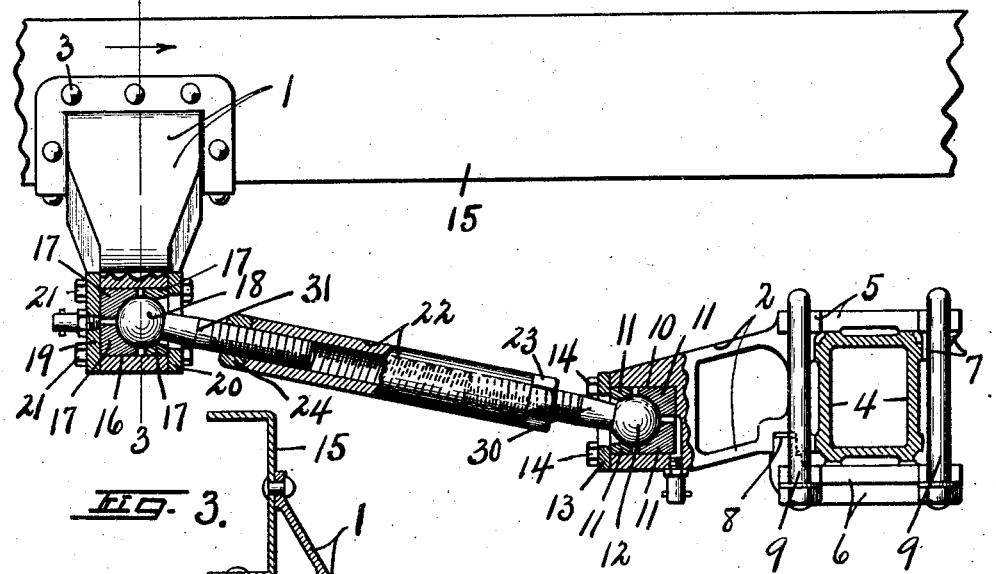
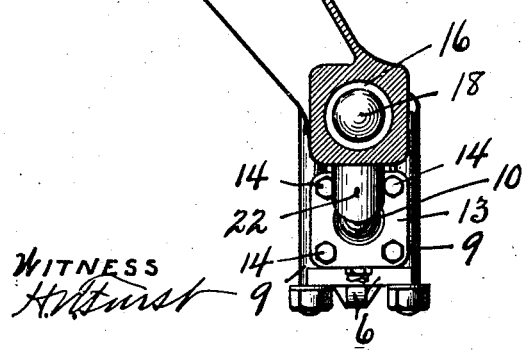
INVENTOR
Fred W. Wilkins
BY Denison Thompson
ATTORNEYS
WITNESS
H. Hurst Patented Oct. 4, 1927.

1,643,970

UNITED STATES PATENT OFFICE.

FRED W. WILKINS, OF SYRACUSE, NEW YORK, ASSIGNOR TO SANFORD MOTOR TRUCK COMPANY, OF SYRACUSE, NEW YORK, A CORPORATION OF NEW YORK.

RADIUS ROD.

Application filed April 17, 1924. Serial No. 707,145.

This invention relates to a certain new and improved radius rod, particularly designed for use in connection with motor vehicles.

The main object of the invention is the production of a radius rod that is freely and preferably universally rotatable about its longitudinal axis, thereby relieving the attaching brackets from tortional strain and eliminating to a great extent the breaking of the brackets or the rod.

Other objects and advantages relate to the details of construction of the apparatus, all as will more fully appear from the following description, taken in connection with the accompanying drawings, in which:—

Figure 1 is an elevation of an apparatus of my invention illustrating in dotted lines a motor vehicle with which the same is assembled.

Figure 2 is a similar view partially in section, omitting the motor vehicle except one of the side bars of the frame.

Figure 3 is a section on line 3—3, Figure 2.

The apparatus of this invention includes two brackets —1— and —2— respectively, the bracket —1— being secured to the side bar —1— of the frame in any suitable manner as by bolts or rivets —3—, while the bracket —2— is secured to the axle —4— of the motor vehicle. The bracket —2— may be formed in two parts, the part —5— being, as shown, of angular form so as to receive two sides of the axle —4— and preferably having a depending flange —7— against a third side of the axle —4—, while the part —6— is of substantially flat form and may interlock at —8— with the part —5— and is adapted to engage the fourth side of the axle —4—, the parts —5— and —6— of the bracket being secured together in any suitable manner so as to rigidly clamp the axle within them as by means of four bolts —9— preferably extending vertically at the four corners of the bracket. Any suitable means for clamping the bracket to the axle may be utilized as the form of such structure is not essential to this invention. The bracket —2— preferably extends forwardly from the axle —4— and may incline downwardly slightly so that the socket formed as hereinafter described is slightly below the axis of the axle. The forward end of the bracket —2— is provided, as shown, with a recess —10— which may be of substantially cylindrical form and substantially horizontally disposed and adapted to receive within it a series of blocks —11—, in this instance, four, which tightly set within the recess —10— and have their inner portions spherically shaped so as to produce a spherical recess within which the ball —12— is tightly fitted, the blocks being clamped together about the ball —12— within the recess as by means of clamping plate —13— extending partially across the cylindrical recess —10— and secured to the forward end of the bracket —2— by means of bolts —14—.

In like manner the bracket —1— has a portion depending which may be outwardly and laterally offset from the frame —15— which is formed with a recess or passageway —16— which may be of substantially cylindrical form and substantially horizontally disposed and in line with the recess —10—, altho in this illustration some distance above it.

Within the passageway —10— there is positioned a series of blocks —17— similar to the blocks —11— and having their interior portions spherically formed so as to define a socket within which the ball —18— is tightly fitted. The blocks —17— are held in proper position to tightly engage the ball —18— by means of the oppositely disposed plates —19— and —20— positioned at opposite ends of the passageway —16—, the plate —19— preferably substantially closing the adjacent end of the passage way —16— while the plate —20— has a central opening leaving an edge portion of sufficient extent so as to extend partially across the passageway —16— to engage the adjacent blocks. The plates are secured together and to the bracket —1— in any suitable manner as by means of bolts —21— preferably four such bolts being used and positioned at the four corners of the plates. Each of the balls —12— and —18— is provided with a stub shaft —30— and —31— respectively, the shafts being threaded into opposite ends of a tubular connecting rod —22— thereby permitting various adjustments in the length of the radius rod so produced, and jamb nuts —23— and —24— are provided for locking the stub shafts in any desired position of adjustment with respect to the tubular rod —22—.

The radius rod proper consisting of the balls —12— and —18— the stud shafts —30— and —31— and the tubular rod —22— has a ball and socket connection with each of the brackets —1— and —2— permitting universal rotary movement of the radius rod, thereby eliminating tortional strain, being applied to the brackets under various conditions of movement of the frame —15— and the axle —4—, but the radius rod always constitutes a substantially rigid thrust connection between the frame and the axle. In actual practice it is found that the radius rod proper is in practically continuous rotary movement during operation of the motor vehicle.

Altho I have shown and described a specific construction as constituting a perhaps preferred embodiment of this invention I do not desire to restrict myself to the details of the structure or the particular form and relation of the parts thereof as various changes may be made within the scope of the appended claims.

I claim:

1. The combination with the frame and axle of a vehicle, of a bracket connected to the frame and formed with a passageway, blocks arranged in said passageway and having their interior portions spherically formed to define a substantially spherical socket, means for confining the blocks in the passageway, a bracket carried by the axle and having a recess, a series of blocks mounted in the recess, and having spherically shaped inner surfaces defining a substantially spherical socket, means for confining said blocks in the recess, and a rod having spherically formed end portions, the end portions being seated in the respective spherical sockets.

2. The combination with the frame and axle of a vehicle, of a bracket connected to the frame and formed with a passageway, blocks arranged in said passageway and having their interior portions spherically formed to define a substantially spherical socket, means for confining the blocks in the passageway, a bracket carried by the axle and having a recess, a series of blocks mounted in the recess, and having spherically shaped inner surfaces defining a substantially spherical socket, having its center some distance below the center of the axle, means for confining said blocks in the recess, and a rod having spherically formed end portions, the end portions being seated in the respective spherical sockets.

In witness whereof I have hereunto set my hand this 18 day of March, 1924.

FRED W. WILKINS.